United States Patent [19]

Ritsko et al.

[11] Patent Number: 4,626,422
[45] Date of Patent: Dec. 2, 1986

[54] HIGH PURITY HIGH SURFACE AREA SILICON NITRIDE

[75] Inventors: Joseph E. Ritsko; Howard L. Acla, both of Towanda, Pa.

[73] Assignee: GTE Products Corporation, Stamford, Conn.

[21] Appl. No.: 748,080

[22] Filed: Jun. 24, 1985

[51] Int. Cl.[4] .................... C01B 21/068; C01B 33/06
[52] U.S. Cl. .................................... 423/344; 423/406
[58] Field of Search ................ 423/344, 406, 338; 502/420, 413

[56] References Cited

U.S. PATENT DOCUMENTS

| | | | |
|---|---|---|---|
| 1,539,342 | 5/1925 | Williams | 423/338 |
| 4,122,155 | 10/1978 | Prochazka et al. | 423/344 |
| 4,514,370 | 4/1985 | Inoue et al. | 423/344 |

FOREIGN PATENT DOCUMENTS 0156311  9/1982  Japan .................... 423/344

OTHER PUBLICATIONS

Chemical Abstracts 99:199568p Manufacture of Silicon Nitride Useful for Ceramic Materials, Denki Kagaku 9/8/83.

*Primary Examiner*—John Doll
*Assistant Examiner*—Lori S. Freeman
*Attorney, Agent, or Firm*—Donald R. Castle; L. Rita Quatrini

[57] ABSTRACT

A process is disclosed for producing high purity high surface area silicon nitride. The process involves contacting silicon tetrachloride with water to form a two phase system consisting essentially of a solid phase which is essentially silica gel and a liquid phase, heating the two phase system at a sufficient temperature for a sufficient time to partially dehydrate the silica gel followed by removing the solid phase from the liquid phase. A slurry is then formed of the solid phase in an aqueous solution of a water soluble organic carbon source. A dispersing agent is added to the slurry to disperse the silica gel, and the pH of the slurry is adjusted to greater than about 7, followed by heating the slurry at a sufficient temperature for a sufficient time to remove essentially all of the water and to decompose the carbon source. The resulting powder mixture of silicon dioxide and carbon is deagglomerated and heated in a nitrogen atmosphere at a sufficient temperature for a sufficient time to form a reaction product the major portion of which is silicon nitride. The reaction product is heated in an air atmosphere at a sufficient temperature for a sufficient time to remove essentially all of the carbon and form the high purity high surface area silicon nitride.

7 Claims, No Drawings

HIGH PURITY HIGH SURFACE AREA SILICON NITRIDE

BACKGROUND OF THE INVENTION

This invention relates to a process for producing silicon nitride. More particularly, it relates to a process for producing high purity high surface area silicon nitride.

Silicon nitride is a refractory fibrous material. Depending on the length of the fibers and how they are processed, the material can be used in cutting tools, engines, reinforcing cast metal parts, or, by using the longer fibers, it can be made into fibers, felts for furnace walls and roof insulation, and flame curtains.

There are several known methods for producing silicon nitride, such as:
1. The reaction between elemental silicon and nitrogen;
2. The reaction between $SiCl_4$ and anhydrous ammonia; and
3. The reduction of $SiO_2$ with carbon in the presence of nitrogen.

A disadvantage of reaction 1 is that pure silicon is expensive and it also requires grinding to powder before it will react with the nitrogen. Grinding introduces impurities, making the process impractical if a pure product is required. In 2, the reaction between $SiCl_4$ and ammonia produces products which are both difficult and expensive to remove. During the process ammonium chloride is produced which must be sublimed off without losing the silicon nitride. This is difficult to do because the silicon nitride is so fine that it is carried out with the ammonium chloride. Furthermore, the process is difficult to control because any oxygen present causes oxidation to $SiO_2$. In 3, the carbon source has been supplied in powder form. With the carbon in powder form, it is difficult to obtain a uniform mixture with the $SiO_2$. Furthermore, some powder sources of carbon are not pure, and the result is relatively impure silicon nitride.

U.S. Pat. Nos. 4,264,565, 4,122,152, 4,368,180, and 4,117,095 disclose processes for producing silicon nitride.

SUMMARY OF THE INVENTION

In accordance with one aspect of this invention there is provided a process for producing high purity high surface area silicon nitride. The process involves contacting silicon tetrachloride with water to form a two phase system consisting essentially of a solid phase which is essentially silica gel and a liquid phase, heating the two phase system at a temperature of at least about 80° C. for a sufficient time to partially dehydrate the silica gel followed by removing the solid phase from the liquid phase. A slurry is then formed of the solid phase in an aqueous solution of a water soluble organic carbon source. A dispersing agent is added to the slurry to disperse the silica gel, and the pH of the slurry is adjusted to greater than about 7 followed by heating the slurry at a sufficient temperature for a sufficient time to remove essentially all of the water and to decompose the carbon source. The resulting powder mixture of silicon dioxide and carbon is deagglomerated and heated in a nitrogen atmosphere at a temperature from about 1450° C. to about 1500° C. for a sufficient time to form a reaction product the major portion of which is silicon nitride. The reaction product is heated in an air atmosphere at a sufficient temperature for a sufficient time to remove essentially all of the carbon and form the high purity surface area silicon nitride.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

Silicon tetrachloride is first contacted with water to hydrolyze the silicon tetrachloride and form a two phase system consisting essentially of a solid phase which is essentially silica gel and a liquid phase which is essentially water and hydrochloric acid. Typically from about 5 to about 8 weight parts of water are used per weight part of the silicon tetrachloride.

The resulting two phase system is then heated at a sufficient temperature for a sufficient time to partially dehydrate the silica gel. The partial dehydration of the silica gel makes it easier to filter in subsequent operations. The partial dehydration also serves to lower the oxygen content in the final silicon nitride product. The heating temperature is preferably at least about 80° C. At lower temperatures, the oxygen is not significantly lowered in the silicon nitride product. The preferred temperature range is from about 80° C. to about 100° C. The heating time depends on the temperature. For example, at a temperature of about 80° C., the heating time is generally about 1 hour.

The solid phase is removed from the liquid phase by any standard technique, and preferably by filtration.

An aqueous solution is then formed of a water soluble organic source of carbon. The solution can be of any convenient concentration. Usually, the concentration is from about 200 to about 250 grams of the carbon source per liter. The water soluble organic carbon source is preferably polyvinyl alcohol, sugars, or polyglycols such as polyethylene glycols. The water soluble carbon source has the advantages of being efficiently mixed with the silica gel for the subsequent reactions, is readily decomposed into elemental carbon, and is of required purity so that the purity of the final silicon nitride product will not be adversely affected.

A slurry is formed of the solid phase in the aqueous solution of the carbon source.

A dispersing agent is added to the slurry to disperse the silica gel. The preferred dispersing agent is acetic acid. When acetic acid is used, it is added in an amount equal to about 10% by weight of the contained $SiO_2$.

The resulting dispersing agent-treated slurry is made basic by adjusting the pH to greater than about 7, and preferably to form about 7 to about 8, preferably with ammonia. On the basic side the silica gel is softer and easier to handle than in the acid range and is not corrosive to equipment.

The resulting pH adjusted slurry is heated at a sufficient temperature for a sufficient time to remove essentially all of the water therefrom and to decompose the water soluble organic source of carbon to elemental carbon and produce a powder mixture of silicon dioxide and carbon. If the water is removed in an air atmosphere, the temperatures generally do not rise above about 200° C., otherwise burning can occur. If removal is done in a nitrogen atmosphere, higher temperatures, for example, from about 300° C. to about 400° C. can be used.

The resulting powder mixture is deagglomerated. This can be done by any standard method such as by vibratory milling.

At this point it is preferred to classify the powder mixture usually by passing the powder through a 200 mesh screen. That portion of the powder which passes through the screen is preferably used in the subsequent heating steps.

The deagglomerated powder is then heated in a nitrogen atmosphere at a sufficient temperature for a sufficient time to form a reaction product the major portion of which is silicon nitride. The carbon serves to reduce the $SiO_2$ to Si. The heating is generally done in a conventional furnace with the material preferably in carbon boats. The heating temperatures are generally from about 1450° C. to about 1500° C. The heating time depends on the size of the charge of the material and on the temperature.

The reaction product is then heated in an air atmosphere at a sufficient temperature for a sufficient time to remove essentially all of the carbon from the reaction product and form a high purity high surface are silicon nitride. The heating temperatures are generally from about 600° C. to about 650° C. Heating times depend on the size of the charge of the reaction product and on the temperature. The heating is generally done in a conventional furnace.

The resulting silicon nitride product has an oxygen content of less than about 1% by weight and a carbon content of less than about 1% by weight, and a surface area of from about 25 to about 40 $m^2/g$.

To more fully illustrate this invention, the following non-limiting example is presented. All parts, portions and percentages are on a weight basis unless otherwise stated.

EXAMPLE

About 195 parts of silicon tetrachloride are added to about 1200 parts of deionized water and hydrolyzed. The resulting silica gel is heated at about 80° C. to about 100° C. for about 1 hour and filtered to remove the resulting hydrochloric acid. About 250 parts of polyvinyl alcohol are added to about 1700 parts of water and heated to solubilize the alcohol. To the resulting aqueous solution of polyvinyl alcohol which is being agitated is added the silica gel. About 37 parts of acetic acid are added and the resulting slurry is made slightly basic by addition of ammonium hydroxide. The resulting pH adjusted slurry is then dried in air at about 200° C. The resulting dried powder is then milled and screened through a 200 mesh screen. The resulting screened $SiO_2/C$ mixture is heated in a furnace in carbon boats at about 1480° C. in a nitrogen atmosphere. The resulting silicon nitride is then heated in an air atmosphere at about 600° C. to about 650° C. to remove excess carbon. The resulting silicon nitride product has an oxygen content of less than about 1% by weight and a carbon content of less than about 1% by weight and a surface area of from about 25 to about 40 $m^2/g$.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing high purity and high surface area silicon nitride, said process comprising:
    (a) contacting silicon tetrachloride with water to hydrolyze said silicon tetrachloride and form a two phase system consisting essentially of a solid phase which is essentially silica gel and a liquid phase;
    (b) heating said two phase system at a temperature of at least about 80° C. to partially dehydrate said silica gel;
    (c) removing said solid phase from said liquid phase;
    (d) forming a slurry of said solid phase in an aqueous solution of a water soluble organic source of carbon;
    (e) adding a dispersing agent to said slurry to disperse the silica gel;
    (f) adjusting the pH of the resulting dispersing agent-treated slurry to greater than about 7;
    (g) heating the resulting pH adjusted slurry at a temperature from about 200° C. to about 400° C. to remove essentially all of the water therefrom and and to decompose the water soluble organic source of carbon to elemental carbon and produce a powder mixture of silicon dioxide and carbon;
    (h) deagglomerating said powder mixture;
    (i) heating the resulting deagglomerated powder mixture in a nitrogen atmosphere at a temperature from about 1450° C. to about 1500° C. to form a reaction product the major portion of which is silicon nitride; and
    (j) heating said reaction product in an air atmosphere at a temperature from about 600° C. to about 650° C. to remove essentially all of the carbon from said reaction product and form a high purity high surface area silicon nitride.

2. A process according to claim 1 wherein said two phase system is heated at a temperature of from about 80° C. to about 100° C.

3. A process according to claim 1 wherein the water soluble source of carbon is selected from the group consisting of polyvinyl alcohol, sugars, and polyglycols.

4. A process according to claim 1 wherein said dispersing agent is acetic acid.

5. A process according to claim 1 wherein after the deagglomerating step the deagglomerated powder mixture is classified and the portion of said mixture which passes through a 200 mesh screen is subjected to the heating steps to form said reaction product and to remove the carbon.

6. A process according to claim 1 wherein said high purity high surface area silicon nitride has an oxygen content of less than about 1% by weight and a carbon content of less than about 1% by weight and a surface area of from about 25 to about 40 $m^2/g$.

7. A process according to claim 1 wherein the pH of the slurry is adjusted with ammonia.

* * * * *